United States Patent
Sadhu et al.

(10) Patent No.: US 11,143,552 B2
(45) Date of Patent: Oct. 12, 2021

(54) METHOD AND APPARATUS TO MITIGATE RIPPLE IN A TIME OF FLIGHT (TOF) SYSTEM

(71) Applicant: Texas Instruments Incorporated, Dallas, TX (US)

(72) Inventors: Subhash Chandra Venkata Sadhu, Bangalore (IN); Bharath Patil, Bangalore (IN)

(73) Assignee: TEXAS INSTRUMENTS INCORPORATED, Dallas, TX (US)

(\*) Notice: Subject to any disclaimer, the term of this patent is extended or adjusted under 35 U.S.C. 154(b) by 648 days.

(21) Appl. No.: 14/698,978

(22) Filed: Apr. 29, 2015

(65) Prior Publication Data
US 2015/0308949 A1   Oct. 29, 2015

(30) Foreign Application Priority Data
Apr. 29, 2014 (IN) .......................... 2159/CHE/2014

(51) Int. Cl.
| | |
|---|---|
| *H01L 27/14* | (2006.01) |
| *G01J 1/46* | (2006.01) |
| *G01S 7/484* | (2006.01) |
| *H05B 45/37* | (2020.01) |

(52) U.S. Cl.
CPC ............... *G01J 1/46* (2013.01); *G01S 7/484* (2013.01); *H05B 45/37* (2020.01); *G01N 2223/506* (2013.01); *Y02B 20/30* (2013.01)

(58) Field of Classification Search
CPC .... G01J 1/46; H05B 37/0272; H05B 33/0815
USPC ......................................... 250/559.38, 559.4
See application file for complete search history.

(56) References Cited

U.S. PATENT DOCUMENTS

| | | | |
|---|---|---|---|
| 2003/0076484 A1* | 4/2003 | Bamji | G01S 17/36 356/5.1 |
| 2006/0000967 A1* | 1/2006 | Kuijk | G01S 7/487 250/221 |
| 2006/0119833 A1* | 6/2006 | Hinderling | G01C 3/08 356/5.11 |
| 2006/0251165 A1* | 11/2006 | Takeuchi | H02M 7/5395 375/238 |
| 2010/0033153 A1* | 2/2010 | Xing | H02M 3/156 323/288 |
| 2011/0215734 A1* | 9/2011 | Shim | G09F 13/04 315/294 |

(Continued)

FOREIGN PATENT DOCUMENTS

BE   WO 2013007787 A1 *   1/2013   ......... H05B 33/0818

OTHER PUBLICATIONS

Ward Van Der Tempel, et al "A 1k-Pixel 3D CMOS Sensor," IEEE Sensors 2008 Conference (pp. 1000-1003).

*Primary Examiner* — Georgia Y Epps
*Assistant Examiner* — Kevin Wyatt
(74) *Attorney, Agent, or Firm* — Ray A. King; Charles A. Brill; Frank D. Cimino

(57) ABSTRACT

The disclosure provides a circuit to mitigate ripple. The circuit includes a controller that generates a PWM (pulse width modulated) clock signal. A DC/DC converter receives the PWM clock signal, and generates an output signal. A light source is coupled to the DC/DC converter, and receives the output signal. The light source transmits light pulses during an integration time. A time integral of the output signal during the integration time is constant during a plurality of quad time periods.

19 Claims, 4 Drawing Sheets

(56) References Cited

U.S. PATENT DOCUMENTS

Figure 3:
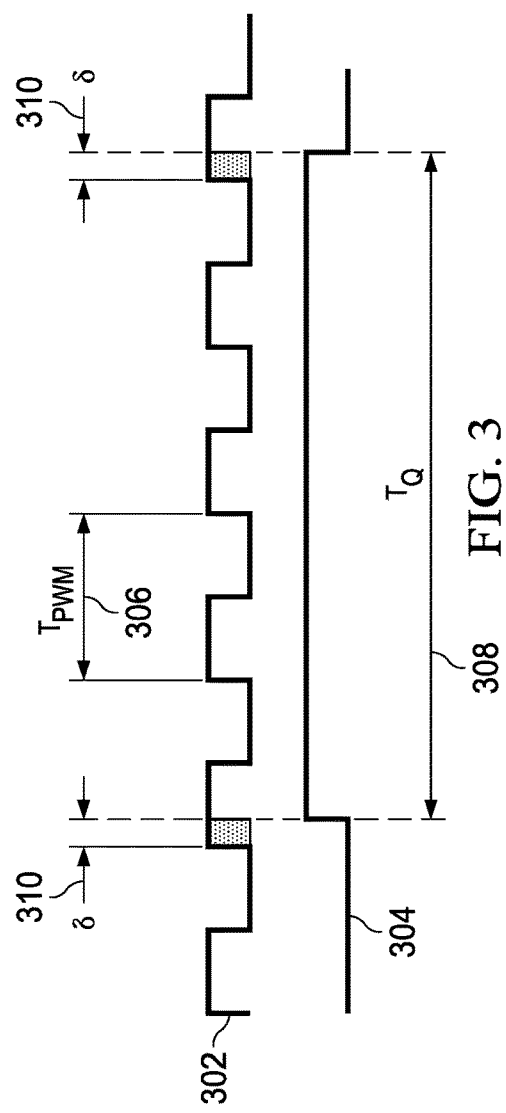

| | | | | |
|---|---|---|---|---|
| 2011/0299059 A1* | 12/2011 | Buettgen | ............... | G01S 7/4911 356/5.01 |
| 2013/0200707 A1* | 8/2013 | Hartmann | .............. | H05B 45/46 307/39 |
| 2014/0312233 A1* | 10/2014 | Mark | ........................ | G01J 1/46 250/341.8 |

* cited by examiner

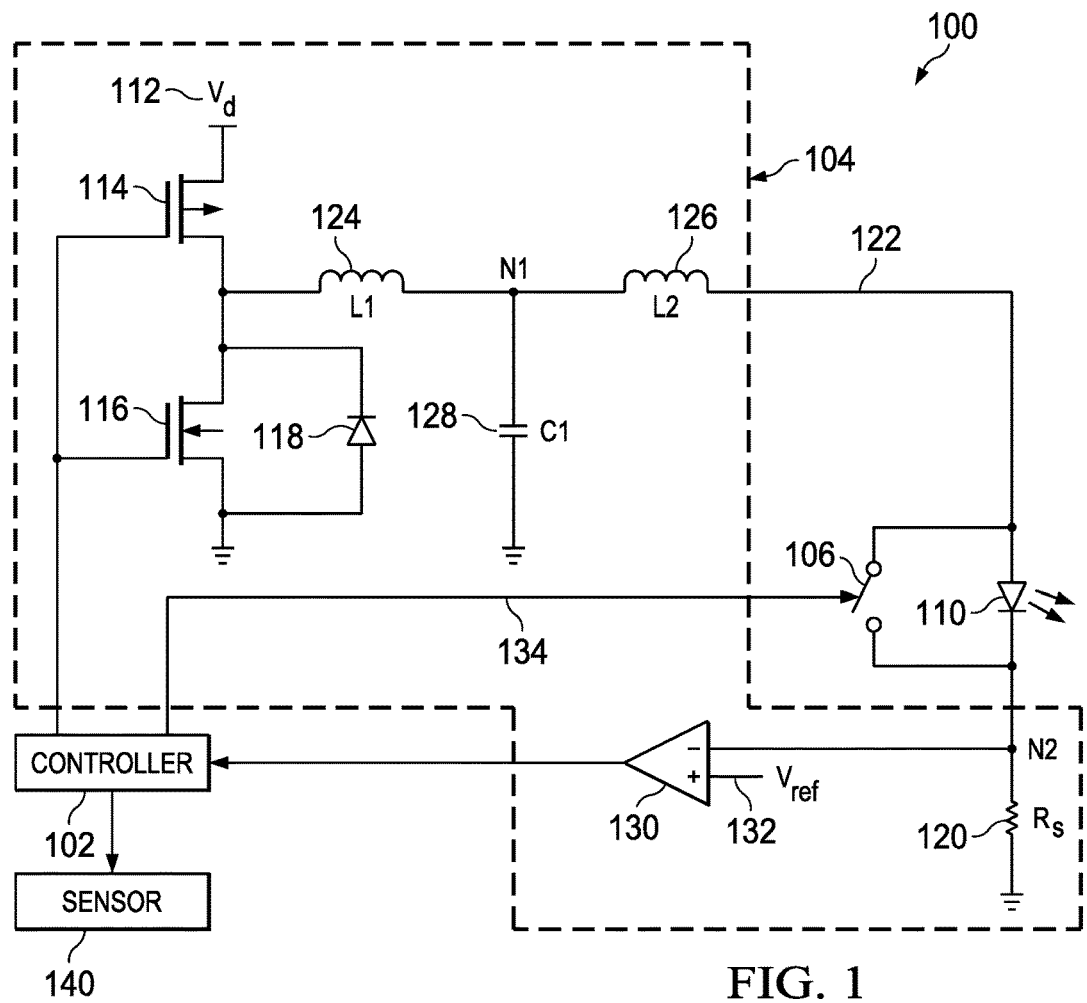
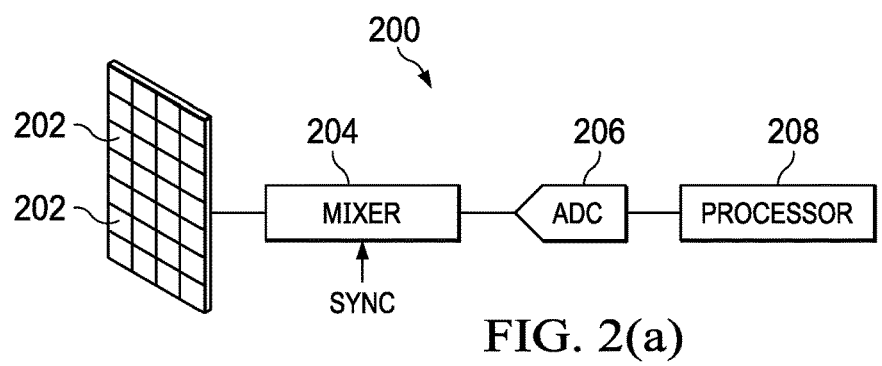
FIG. 2(a)
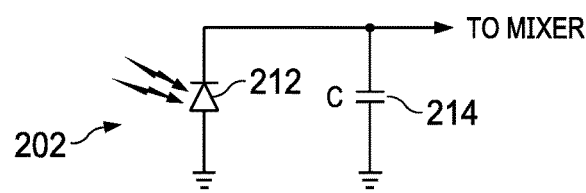
FIG. 2(b)

METHOD AND APPARATUS TO MITIGATE RIPPLE IN A TIME OF FLIGHT (TOF) SYSTEM

CROSS REFERENCES TO RELATED APPLICATIONS

This application claims priority from India provisional patent application No. 2159/CHE/2014 filed on Apr. 29, 2014 which is hereby incorporated by reference in its entirety.

TECHNICAL FIELD

The present disclosure is generally related to time of flight (TOF) systems, and more particularly to mitigating ripple in a TOF system.

BACKGROUND

An emerging category of electronic devices is time of flight (TOF) systems. The TOF systems find applications in accelerometers, monolithic gyroscopes, light sensors, conveyor belts, depth sensing, proximity sensing, gesture recognition and imagers. A TOF system includes a light source that emits light pulses. The light pulses are emitted towards one or more objects, which reflect the light pulses. The one or more objects may include, but not limited to, a human, an automated component, an animal, an electronic device etc. A TOF sensor in the TOF system receives the reflected light pulses. The TOF sensor receives the reflected light pulses after a time of flight, which is proportional to a distance of the target from the TOF system. The TOF sensor includes one or more pixels. The TOF sensor processes the reflected light pulses to estimate a depth of the one or more objects.

The TOF systems are susceptible to ripple in a power supply that energizes the light source. In some TOF systems, DC/DC converters are used in the power supply. A time variant voltage is generated from a voltage source or a time variant current is generated from a current source when PWM (pulse width modulated) based switching DC/DC converters are used. These DC/DC converters have a characteristic ripple because of PWM switching. This results a ripple in the generated voltage or current.

This ripple can cause the light pulses generated by the light source to have an artefact. An envelope of a light waveform generated by the light source varies with the ripple in the power supply. A TOF system cannot estimate the depth of the one or more objects correctly if the same amount of light is not generated during a defined period. This leads to a time varying offset in the estimated depth, and a considerable increase in noise level of the TOF system.

One existing solution is to increase the size of passive devices used in the DC/DC converters. However, this solution increases the cost and size of the TOF system. Another solution is to increase a switching frequency of the DC/DC converters. This leads to higher losses in the DC/DC converters, and makes the TOF system inefficient.

In some TOF systems, the power supply includes a feedback based control system which regulates an output of the power supply. When such power supply is used with the TOF system, a variation in a load provided by the TOF system causes a feedback ripple in the output of the power supply. The feedback ripple introduces similar consequences as discussed above with respect to the ripple introduced by PWM switching.

SUMMARY

According to an aspect of the disclosure, a circuit is disclosed. The circuit includes a controller that generates a PWM (pulse width modulated) clock signal. A DC/DC converter receives the PWM clock signal, and generates an output signal. A light source is coupled to the DC/DC converter, and receives the output signal. The light source transmits light pulses during an integration time. A time integral of the output signal during the integration time is constant during a plurality of quad time periods.

BRIEF DESCRIPTION OF THE VIEWS OF DRAWINGS

Figure 4:
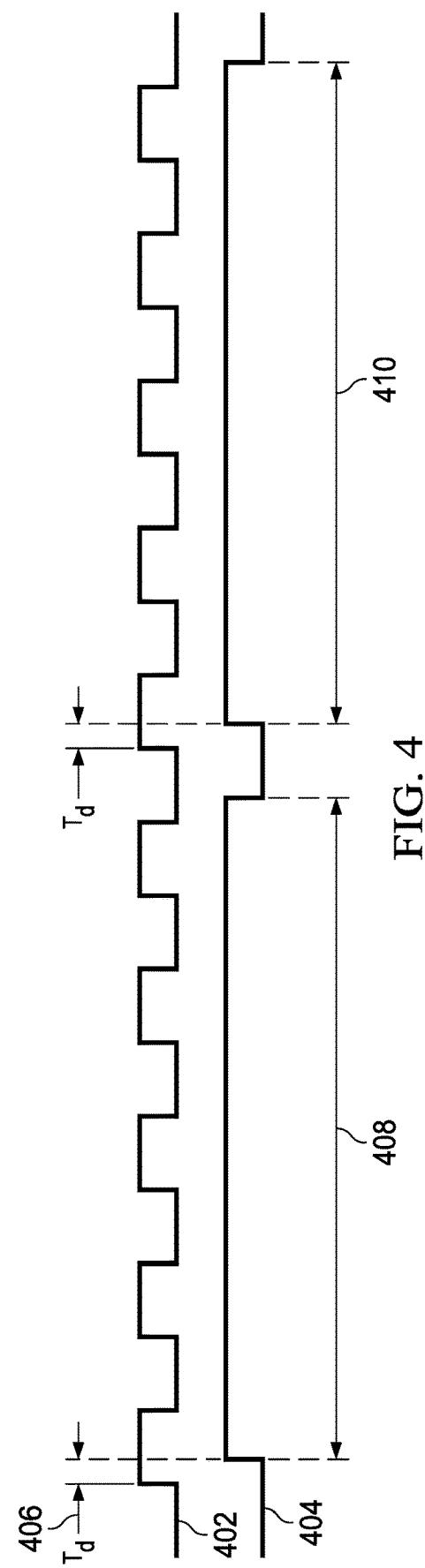
Figure 5:
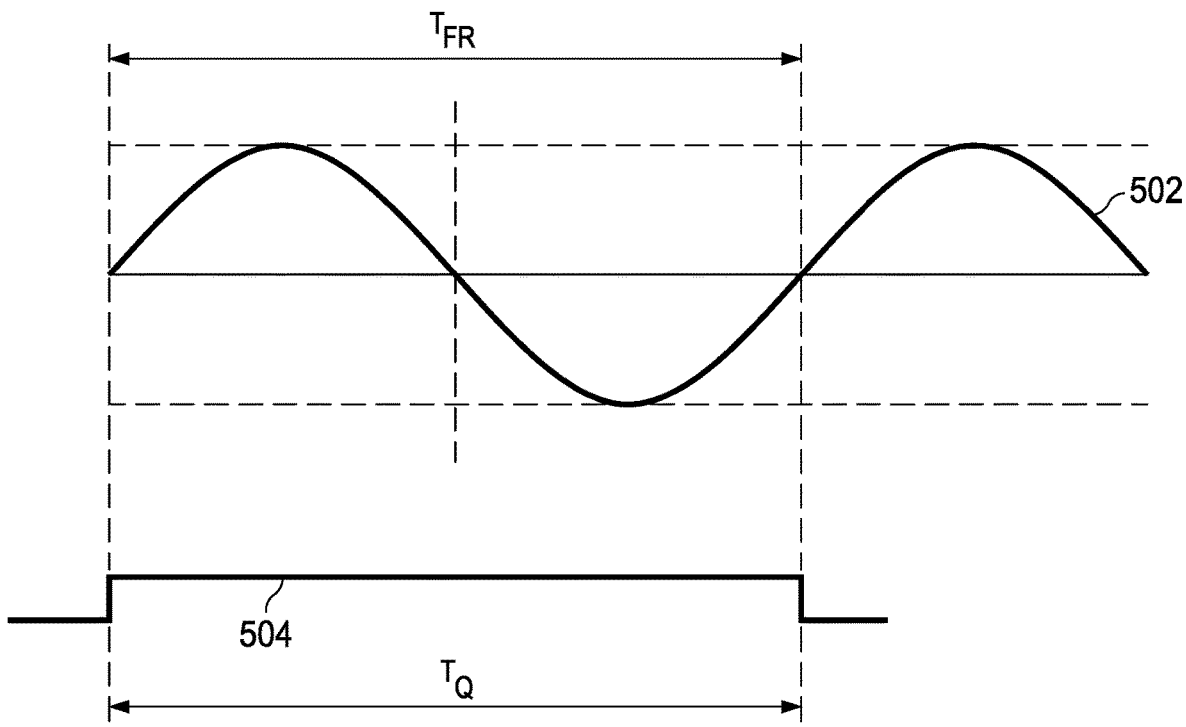
Figure 6:
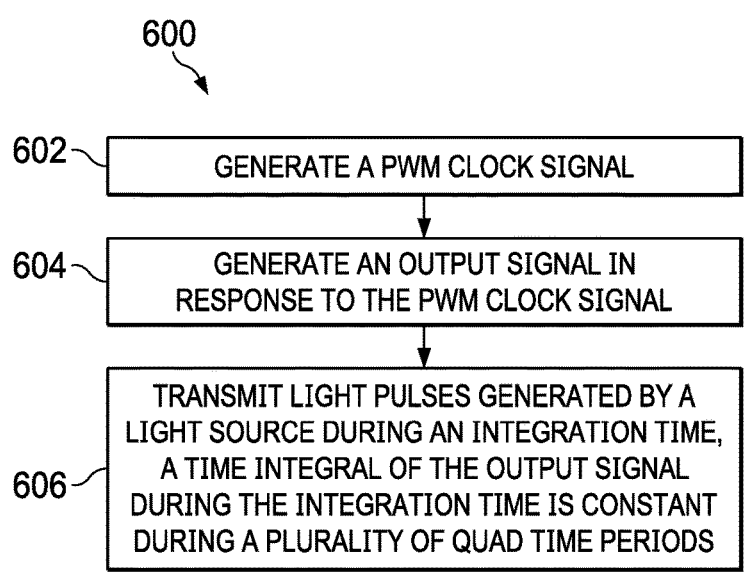
Figure 7:
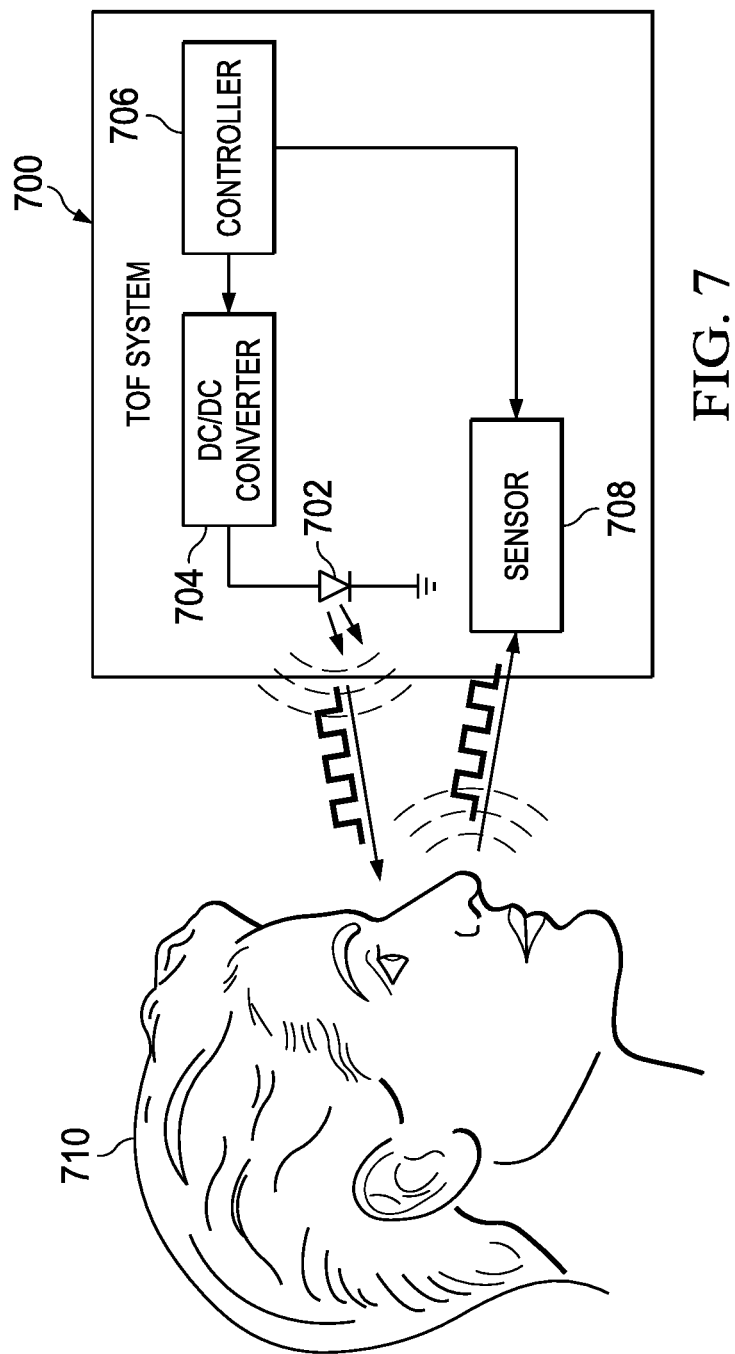

FIG. 1 illustrates a circuit, according to an embodiment;
FIG. 2(a) illustrates a sensor, according to an embodiment;
FIG. 2(b) illustrates a pixel, according to an embodiment;
FIG. 3 is a timing diagram to illustrate operation of the circuit illustrated in FIG. 1, according to an embodiment;
FIG. 4 is a timing diagram to illustrate operation of the circuit illustrated in FIG. 1, according to an embodiment;
FIG. 5 is a timing diagram to illustrate operation of the circuit illustrated in FIG. 1, according to an embodiment;
FIG. 6 is a flowchart to illustrate a method of operation of a circuit, according to an embodiment; and
FIG. 7 illustrates a time of flight (TOF) system, according to an embodiment.

DETAILED DESCRIPTION OF THE EMBODIMENTS

FIG. 1 illustrates a circuit 100, according to an embodiment. The circuit 100 includes a controller 102, a DC/DC converter 104, a switch 106, a light source 110 and a sensor 140. The DC/DC converter 104 is coupled to the controller 102. The light source 110 is coupled to the DC/DC converter 104. The switch 106 is coupled in parallel to the light source 110. The sensor 140 is coupled to the controller 102.

The DC/DC converter 104 includes a PMOS transistor 114, and an NMOS transistor 116. A gate terminal of each of the PMOS transistor 114 and the NMOS transistor 116 are coupled to the controller 102. A source terminal of the PMOS transistor 114 is coupled to a power source Vd 112. A source terminal of the NMOS transistor 116 is coupled to a ground terminal. The source terminal of the NMOS transistor 116, and a drain terminal of the NMOS transistor 116 are coupled through a diode 118.

The DC/DC converter 104 includes a first inductor L1 124, a second inductor L2 126 and a first capacitor C1 128. The first inductor L1 124 and the second inductor L2 126 are coupled at a first node N1 in series. One end of the first inductor L1 124 is coupled to a drain terminal of each of the PMOS transistor 114 and the NMOS transistor 116. The first capacitor C1 128 is coupled between the first node N1 and the ground terminal.

The light source 110 is coupled to one end of the second inductor L2 126. The DC/DC converter 104 further includes a sense resistor Rs 120, and a comparator 130. The sense resistor Rs 120 and the light source 110 are coupled at a second node N2. The sense resistor Rs 120 is coupled between the light source 110 and the ground terminal. The comparator 130 is coupled to the second node N2, and also receives a reference voltage Vref 132. The comparator 130 is further coupled to the controller 102. The sensor 140 is coupled to the controller 102.

The DC/DC converter 104 is exemplary, and is one of the many ways of implementing the DC/DC converter, and variations, and alternative constructions are apparent and well within the spirit and scope of the disclosure. The circuit 100 may include one or more additional components known to those skilled in the relevant art and are not discussed here for simplicity of the description.

The operation of the circuit 100 illustrated in FIG. 1 is explained now. The controller 102 generates a PWM (pulse width modulated) clock signal. The DC/DC converter 104 receives the PWM clock signal from the controller 102. The PWM clock signal activates at least one of the PMOS transistor 114 and the NMOS transistor 116 at a given time instant. The combination of the PMOS transistor 114 and the NMOS transistor 116 generates a PWM waveform.

A combination of the first inductor L1 124, the second inductor L2 126 and the first capacitor C1 128 behaves as a filter, and averages the PWM waveform to generate an output signal 122. The output signal 122 is received by the light source 110. The output signal 122 is at least one of a voltage signal and a current signal.

The light source 110 receives the output signal 122, and transmits light pulses. The light pulses are transmitted in a frame. A frame includes a plurality of quad time periods. In general, the frame transmitted by the light source 110 has 4 quad time periods. The 4 quad time periods are used to obtain quadrature and in-phase data. In one example, the 4 quad time periods correspond to 0°, 90°, 180°, 270°. Thus it is essential in circuit 100, that an envelope of a light waveform generated by the light source 110 is same in all the four quad time periods.

Each quad time period of the plurality of quad time periods includes a reset time, an integration time, a readout time and a dead time. In an example, a quad time period of 1000 μs, the reset time is 20 μs, the integration time is 200 μs, the readout time is 775 μs and the dead time is 5 μs. These values are exemplary to illustrate a proportion of different intervals in a quad time period.

During reset time, the sensor 140 is reset. During the integration time, the light source 110 transmits light pulses and the sensor 140 is active. During the readout time, the light source 110 is disabled and the sensor 140 is active. During the dead time, the light source 110 and the sensor 140 are disabled.

The switch 106 is activated by an enable signal 134 received from the controller 102. The switch 106 is activated by the controller 102 during the integration time. The light source 110 receives the output signal 122, and transmits light pulses during the integration time. A time integral of the output signal 122 during the integration time is constant during a plurality of quad time periods.

Thus, a time integral of the output signal 122 during an integration time in a first quad time period is equal to a time integral of the output signal 122 during an integration time in a second quad time period. The plurality of quad time periods include the first quad time period and the second quad time period.

The circuit 100 uses a DC/DC converter 104 that generates the output signal 122 which energizes the light source 110. The output signal 122 has an associated ripple because of the DC/DC converter 104. To mitigate this ripple, the time integral of the output signal 122 during the integration time is made constant during a plurality of quad time periods. The light source 110 transmits light pulses during the integration time. Thus, an envelope of a light waveform generated by the light source 110 is same in each quad time period despite of the ripple in the output signal 122.

In one version, a time period of each quad time period is a positive integer multiple of a time period of the PWM clock signal generated by the controller 102. When $T_Q$ is the time period of a quad time period, and $T_{PWM}$ is the time period of the PWM clock signal;

$$T_Q = N * T_{PWM} \quad (1)$$

where, N is a positive integer. N is not equal to 0. In one example, N is one of 1,2,3,4 or 5.

This technique ensures that the time integral of the output signal 122 during the integration time is constant during a plurality of quad time periods. In one example, when the time period of the PWM clock signal is 2 μs, the quad time period is selected as one of 200 μs, 400 μs and 600 μs. In one example, the controller 102 varies the time period of the PWM clock signal to achieve the condition mentioned in equation 1. In another example, the controller 102 varies the quad time period to achieve the condition mentioned in equation 1.

In another version, a time difference between a positive edge of each quad time period and a positive edge of PWM clock signal is constant. For example, the time difference between the positive edge of the first quad time period and the positive edge of PWM clock signal is Td. Also, the time difference between the positive edge of the second quad time period and the positive edge of the PWM clock signal is Td.

In one example, the positive edge of the quad time period is synchronized to the positive edge of the PWM clock signal, and thus the time difference is zero. In another example, the DC/DC converter 104 is asynchronously reset at the start of each quad time period. The PWM clock signal generated by the DC/DC converter 104 will have an edge (positive edge or negative edge) at a time difference Td from the start of the quad time period.

Thus, every quad time period will have an exact replica of the output signal 122 which is provided to the light source 110. This ensures that the light source 110 receives same energy across different quad time periods. This technique also ensures that the time integral of the output signal 122 during the integration time is constant during a plurality of quad time periods.

As illustrated, the DC/DC converter 104 has a feedback control system which include the sense resistor Rs 120 and the comparator 130. An output of the comparator 130 is provided as feedback to the controller 102. A frequency of the DC/DC converter 104 is less than a switching frequency of the PWM clock signal. This introduces a feedback ripple in the output signal 122.

The feedback ripple has a ripple time period. To mitigate the effect of the feedback ripple, the time period of each quad time period of the plurality of quad time periods is made a positive integer multiple of ripple time period. When $T_Q$ is the time period of a quad time period, and $T_{FR}$ is the ripple time period of the feedback ripple;

$$T_Q = N * T_{FR} \quad (2)$$

where, N is a positive integer. N is not equal to 0. In one example, N is one of 1,2,3,4 or 5.

Thus, an envelope of a light waveform generated by the light source 110 is same in each quad time period despite of the feedback ripple in the output signal 122. This technique ensures that the time integral of the output signal 122 during the integration time is constant during a plurality of quad time periods. In one example, a dead time period in the quad time period is changed to achieve the condition discussed in equation 2.

The light pulses generated by the light source 110 are scattered by one or more objects to generate reflected light pulses. The reflected light pulses are received by the sensor 140. The sensor processes the reflected light pulses to generate an image of the one or more objects. The operation of the sensor is illustrated in detail in connection with FIG. 2(a).

FIG. 2(a) illustrates a sensor 200, according to an embodiment. The sensor 200 is similar in connection and operation to the sensor 140 illustrated in FIG. 1. The operation of the sensor 200 is explained in connection with the circuit 100 illustrated in FIG. 1. The sensor 200 includes a plurality of pixels illustrated as 202. In one example, the sensor 200 includes a single pixel. The sensor also includes a mixer 204, an analog to digital converter (ADC) 206 and a processor 208.

Each pixel such as pixel 202 of the plurality of pixels receive reflected light pulses. The light pulses generated by the light source 110 are scattered by one or more objects to generate the reflected light pulses. Each pixel generates a demodulated signal which is received by the mixer 204. The mixer 204 also receives a synchronization signal (SYNC) from the controller 102.

In one example, the mixer 204 receives multiple synchronization signals from the controller 102. In another example, the synchronization signal (SYNC) has a time period equal to the quad time period. In yet another example, the synchronization signal (SYNC) has a frequency equal to a frequency of the light pulses generated by the light source 110.

The mixer 204 generates a mixed signal. The ADC 206 is coupled to the mixer 204, and generates a digital signal in response to the mixed signal received from the mixer 204. The processor 208 is coupled to the ADC 206 and generates an image of the one or more objects from the digital signal received from the ADC 206.

FIG. 2(b) illustrates a pixel 202, according to an embodiment. The pixel 202 is one pixel of the plurality of pixels illustrated in FIG. 2(a). The pixel 202 includes a photodiode 212, and a coupling capacitor C 214 coupled to the photodiode 212. The photodiode 212 receives the reflected light pulses and generates a current signal.

The coupling capacitor C 214 generates a demodulated signal in response to the current signal received from the photodiode 212. The demodulated signal is provided to the mixer as discussed in connection with FIG. 2(a). The operation of the sensor 200 is now explained in conjunction with the circuit 100 for a given quad time period.

A quad time period includes a reset time, an integration time, a readout time and a dead time. During reset time, the sensor 200 is reset, and each pixel of the plurality of pixels is reset. The mixer 204 and the ADC 206 are disabled during this time. During the integration time, the light source 110 transmits light pulses and the photodiode 212 in each pixel receives the reflected light pluses. The mixer 204 and the ADC 206 are disabled during this time.

During the readout time, the light source 110 is disabled and the mixer 204 receives the demodulated signal from each pixel of the plurality of pixels. The ADC 206 generates the digital signal based on the mixed signal received from the mixer 204. During the dead time, the light source 110 and the ADC 206 are disabled.

FIG. 3 is a timing diagram to illustrate operation of the circuit 100, according to an embodiment. The waveform 302 represents the PWM clock signal generated by the controller 102. The waveform 304 represents the quad time period. The circuit 100 uses a DC/DC converter 104 that generates the output signal 122 which energizes the light source 110. The output signal 122 has an associated ripple because of the DC/DC converter 104.

To mitigate this ripple, a time period of each quad time period is made a positive integer multiple of a time period of the PWM clock signal generated by the controller 102. When $T_Q$ 308 is the time period of the quad time period 304, and $T_{PWM}$ 306 is the time period of the PWM clock signal 302;

$$T_Q = N * T_{PWM} \quad (3)$$

where, N is a positive integer. N is not equal to 0. In one example, N is one of 1,2,3,4 or 5.

δ 310 represent a time delay between the start of the time period $T_Q$ 308 and the PWM clock signal 302. It is ensured that this time delay δ 310 is covered before end of the time period $T_Q$ 308. This technique ensures that the time integral of the output signal 122 during the integration time is constant during a plurality of quad time periods.

In one example, when the time period $T_{PWM}$ 306 of the PWM clock signal 302 is 2 µs, the time period $T_Q$ 308 of quad time period 304 is selected as one of 200 µs, 400 µs and 600 µs. Thus, an envelope of a light waveform generated by the light source 110 is same in each quad time period despite of the ripple in the output signal 122.

FIG. 4 is a timing diagram to illustrate operation of the circuit 100, according to an embodiment. The waveform 402 represents the PWM clock signal generated by the controller 102. The waveform 404 represents the quad time periods. The circuit 100 uses a DC/DC converter 104 that generates the output signal 122 which energizes the light source 110. The output signal 122 has an associated ripple because of the DC/DC converter 104.

To mitigate this ripple, a time difference between a positive edge of each quad time period and a positive edge of PWM clock signal is constant. For example, the time difference between the positive edge of the first quad time period 408 and the positive edge of PWM clock signal 402 is Td 406. Also, the time difference between the positive edge of the second quad time period 410 and the positive edge of the PWM clock signal 402 is Td 406.

In one example, the positive edge of the quad time period is synchronized to the positive edge of the PWM clock signal 402, and thus the time difference is zero. In another example, the DC/DC converter 104 is asynchronously reset at the start of each quad time period. The PWM clock signal 402 generated by the DC/DC converter 104 will have an edge (positive edge or negative edge) at a time difference Td from the start of the quad time period.

Thus, every quad time period will have an exact replica of the output signal 122 which is provided to the light source 110. This ensures that the light source 110 receives same energy across different quad time periods. This technique also ensures that the time integral of the output signal 122 during the integration time is constant during a plurality of quad time periods. The plurality of quad time periods include the first quad time period 408 and the second quad time period 410.

FIG. 5 is a timing diagram to illustrate operation of the circuit 100, according to an embodiment. The waveform 502 represents a feedback ripple generated in the output signal 122. The waveform 504 represents the quad time period.

The DC/DC converter 104 has a feedback control system which includes the sense resistor Rs 120 and the comparator 130. An output of the comparator 130 is provided as feedback to the controller 102. A frequency of the DC/DC converter 104 is less than a switching frequency of the PWM clock signal. This introduces the feedback ripple 502 in the output signal 122.

The feedback ripple 502 has a ripple time period $T_{FR}$. To mitigate the effect of the feedback ripple, the time period of each quad time period of the plurality of quad time periods is made a positive integer multiple of ripple time period $T_{FR}$. When $T_Q$ is the time period of the quad time period 504, and $T_{FR}$ is the ripple time period of the feedback ripple 502;

$$T_Q = N * T_{FR} \quad (4)$$

where, N is a positive integer. N is not equal to 0. In one example, N is one of 1,2,3,4 or 5.

Thus, an envelope of a light waveform generated by the light source 110 is same in each quad time period despite of the feedback ripple 502 in the output signal 122. This technique ensures that the time integral of the output signal 122 during the integration time is constant during a plurality of quad time periods. In one example, a dead time period in the quad time period 504 is changed to achieve the condition discussed in equation 4.

FIG. 6 is a flowchart 600 to illustrate a method of operation of a circuit, according to an embodiment. At step 602, a PWM (pulse width modulated) clock signal is generated. At step 604, an output signal is generated in response to the PWM clock signal. For example, in circuit 100, the output signal 122 is generated in response to the PWM clock signal generated by the controller 102.

At step 606, light pulses generated by a light source are transmitted during an integration time. A time integral of the output signal during the integration time is constant during a plurality of quad time periods. Thus, a time integral of the output signal during an integration time in a first quad time period is equal to a time integral of the output signal during an integration time in a second quad time period. The plurality of quad time periods include the first quad time period and the second quad time period.

For example, in circuit 100, the output signal 122 has an associated ripple because of the DC/DC converter 104. To mitigate this ripple, the time integral of the output signal 122 during the integration time is made constant during a plurality of quad time periods. Thus, an envelope of a light waveform generated by the light source 110 is same in each quad time period despite of the ripple in the output signal 122.

In one version, a time period of each quad time period is a positive integer multiple of a time period of the PWM clock signal. This technique ensures that the time integral of the output signal during the integration time is constant during a plurality of quad time periods. In one example, when the time period of the PWM clock signal is 2 μs, the quad time period is selected as one of 200 μs, 400 μs and 600 μs.

In another version, a time difference between a positive edge of each quad time period and a positive edge of PWM clock signal is constant. For example, the time difference between the positive edge of the first quad time period and the positive edge of PWM clock signal is Td. Also, the time difference between the positive edge of the second quad time period and the positive edge of the PWM clock signal is Td.

This ensures that the light source receives same energy across different quad time periods. This technique also ensures that the time integral of the output signal during the integration time is constant during a plurality of quad time periods.

In yet another version, to mitigate the effect of the feedback ripple in the output signal, the time period of each quad time period of the plurality of quad time periods is made a positive integer multiple of ripple time period. Thus, an envelope of a light waveform generated by the light source is same in each quad time period despite of the feedback ripple in the output signal.

The light pulses generated by the light source are scattered by one or more objects to generate reflected light pulses. One or more photodiodes receive the reflected light pulses, and generate a current signal. A demodulated signal is generated from the current signal. A mixed signal is generated from the demodulated signal and a synchronization signal. A digital signal is generated from the mixed signal, and the digital signal is processed to generate an image of the one or more objects.

FIG. 7 illustrates a time of flight (TOF) system 700, according to an embodiment. The TOF system 700 includes a light source 702, a DC/DC converter 704, a controller 706 and a sensor 708. The light source 702 is coupled to the DC/DC converter 704. The controller 706 is coupled to the DC/DC converter 704 and the sensor 708. In one version, the controller 706 is also coupled to the light source 702.

In one example, the light source 702 is an infrared (IR) light emitting diode (LED) that transmits IR light. The sensor 708 includes one or more pixels. The TOF system 700 is analogous to the circuit 100 in connection and operation. The sensor 708 is similar in connection and operation to the sensor 200 illustrated in FIG. 2(a).

The sensor 708 includes a processor. In another example, the sensor 708 includes one or more processors. The processor can be, for example, a CISC-type (Complex Instruction Set Computer) CPU, RISC-type CPU (Reduced Instruction Set Computer), or a digital signal processor (DSP).

The controller 706 generates a PWM (pulse width modulated) clock signal. The DC/DC converter 704 generates an output signal. The output signal is received by the light source 702. The output signal is at least one of a voltage signal and a current signal. The light source 702 receives the output signal, and transmits light pulses. The light pulses are transmitted in a frame. In general, the frame transmitted by the light source 702 includes a plurality of quad time periods. Each quad time period of the plurality of quad time periods includes a reset time, an integration time, a readout time and a dead time.

During reset time, the sensor 708 is reset. During the integration time, the light source 702 transmits light pulses and the sensor 708 is active. During the readout time, the light source 702 is disabled and the sensor 708 is active. During the dead time, the light source 702 and the sensor 708 are disabled.

The light source 702 receives the output signal, and transmits light pulses during the integration time. A time integral of the output signal during the integration time is constant during a plurality of quad time periods. Thus, a time integral of the output signal during an integration time in a first quad time period is equal to a time integral of the output signal during an integration time in a second quad time period.

The plurality of quad time periods include the first quad time period and the second quad time period. Thus, an envelope of a light waveform generated by the light source 702 is same in each quad time period despite of the ripple in the output signal.

In one version, a time period of each quad time period is a positive integer multiple of a time period of the PWM clock signal. This technique ensures that the time integral of the output signal during the integration time is constant during a plurality of quad time periods. In one example, when the time period of the PWM clock signal is 2 µs, the quad time period is selected as one of 200 µs, 400 µs and 600 µs.

In another version, a time difference between a positive edge of each quad time period and a positive edge of PWM clock signal is constant. For example, the time difference between the positive edge of the first quad time period and the positive edge of PWM clock signal is Td. Also, the time difference between the positive edge of the second quad time period and the positive edge of the PWM clock signal is Td.

This ensures that the light source receives same energy across different quad time periods. This technique also ensures that the time integral of the output signal during the integration time is constant during a plurality of quad time periods.

In yet another version, to mitigate the effect of the feedback ripple in the output signal, the time period of each quad time period of the plurality of quad time periods is made a positive integer multiple of ripple time period. Thus, an envelope of a light waveform generated by the light source is same in each quad time period despite of the feedback ripple in the output signal.

The light pulses generated by the light source are scattered by an object 710 to generate reflected light pulses. One or more photodiodes receive the reflected light pulses, and generate a current signal. A demodulated signal is generated from the current signal. A mixed signal is generated from the demodulated signal and a synchronization signal. A digital signal is generated from the mixed signal, and the digital signal is processed to generate an image of the object 710.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A TOF (time of flight) circuit comprising:
    a controller having a controller output, the controller configured to generate a PWM (pulse width modulated) clock signal at the controller output;
    a DC/DC converter configured to receive the PWM clock signal and provide an output signal, the DC/DC converter including:
        a capacitor having first and second capacitor terminals, the first capacitor terminal coupled to a ground;
        a first inductor directly coupled to the second capacitor terminal; and
        a second inductor directly coupled to the second capacitor terminal; and
    a light source coupled to the DC/DC converter, the light source configured to receive the output signal, and transmit light pulses during an integration time period of a quad time period of a frame, each frame including quad time periods equal to a positive integer multiple of a time period of the PWM clock signal, each quad time period having a reset time period, the integration time period, a readout time period, and a dead time period.

2. The circuit of claim 1 further comprising:
    a switch coupled in parallel to the light source, the switch configured to be activated by an enable signal during the integration time period.

3. The circuit of claim 1, wherein the output signal is at least one of a voltage signal and a current signal.

4. The circuit of claim 1, wherein the time integral of the output signal during the integration time is constant during the quad time periods.

5. The circuit of claim 1, wherein the light pulses transmitted during the integration time exhibit a time difference between a positive edge of each quad time period and a positive edge of the PWM clock signal that is constant.

6. The circuit of claim 1, wherein the DC/DC converter is further configured to generate the output signal with a feedback ripple, the feedback ripple having a ripple time period, wherein the time period of each quad time period of the plurality of quad time periods is a positive integer multiple of the ripple time period.

7. The circuit of claim 1 further comprising:
    a sensor coupled to the controller, the sensor having pixels.

8. The circuit of claim 7, wherein each sensor pixel comprises:
    a photodiode configured to receive reflected light pulses and generate a current signal, the reflected light pulses generated when transmitted light pulses are scattered by one or more objects; and
    a coupling capacitor coupled to the photodiode, the coupling capacitor configured to receive the current signal and generate a demodulated signal in response to the received current signal.

9. The circuit of claim 7, wherein the sensor further comprises:
    a mixer coupled to the pixels, the mixer configured to receive a synchronization signal from the controller and the demodulated signal from each pixel, the mixer further configured to generate a mixed signal;
    an ADC (analog to digital converter) coupled to the mixer and configured to generate a digital signal in response to the mixed signal; and
    a processor coupled to the ADC, the processor is configured to receive the digital signal and generate an image of the one or more objects.

10. The circuit of claim 7, wherein during the reset time period of the quad time period, each pixel is reset.

11. The circuit of claim 9, wherein during the dead time period of the quad time period, the light source and the ADC are disabled.

12. A method comprising:
    generating, by a controller in a time of flight (TOF) system, a PWM clock signal;
    receiving, by a DC/DC converter, the PWM clock signal;
    generating, by the DC/DC converter, an output signal in response to the PWM clock signal, in which the DC/DC converter includes a first inductor directly coupled to a first terminal of a capacitor and a second inductor directly coupled to the first terminal of the capacitor, and wherein a second terminal of the capacitor is coupled to ground; and
    transmitting light pulses provided by a light source during an integration time of a quad time period of a frame, each frame including quad time periods equal to a positive integer multiple of a time period of the PWM clock signal, each quad time period having a reset time period, the integration time period, a readout time period, and a dead time period.

13. The circuit of claim 7, wherein during the integration time period, the light source transmits light pulses, and the photodiode in each pixel receives the reflected light pulses.

14. The circuit of claim 9, wherein during the readout time period of the quad time period, the light source is disabled, and the mixer receives the demodulated signal from each pixel.

15. The method of claim 12, wherein a time integral of the output signal during the integration time period is constant during the quad time periods.

16. The method of claim 12, wherein a time difference between a positive edge of each quad time period and a positive edge of the PWM clock signal is constant.

17. The method of claim 12, wherein the output signal includes a feedback ripple having a ripple time period, wherein the time period of each quad time period is a positive integer multiple of the ripple time period.

18. The method of claim 12 further comprising:
receiving, by one or more photodiodes, reflected light pulses, the reflected light pulses generated when transmitted light pulses are scattered by one or more objects;
generating, by one or more photodiodes, a current signal from the reflected light pulses;
generating a demodulated signal from the current signal;
generating a mixed signal from the demodulated signal and a synchronization signal;
generating a digital signal from the mixed signal; and
processing the digital signal to generate an image of the one or more objects.

19. A TOF (time of flight) system comprising:
a controller configured to generate a PWM (pulse width modulated) clock signal;
a DC/DC converter configured to receive the PWM clock signal and provide an output signal;
a light source coupled to the DC/DC converter, the light source configured to receive the output signal and transmit light pulses during an integration time period of a quad time of a frame, each frame of successive frames including quad time periods, each quad time period equal to a positive integer multiple of a time period of the PWM clock signal; and
a sensor coupled to the controller, and configured to receive reflected light pulses and generate an image of one or more objects, the light pulses scattered by the one or more objects to provide the reflected light pulses.

* * * * *